March 23, 1948.  C. D. PETERSON ET AL  2,438,183
POWER TAKE-OFF
Filed May 17, 1944  2 Sheets-Sheet 1

INVENTORS:
Carl D. Peterson &
Elmer J. Barth,
BY
Bodell & Thompson
ATTORNEYS.

March 23, 1948. C. D. PETERSON ET AL 2,438,183
POWER TAKE-OFF
Filed May 17, 1944 2 Sheets-Sheet 2
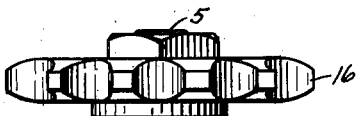
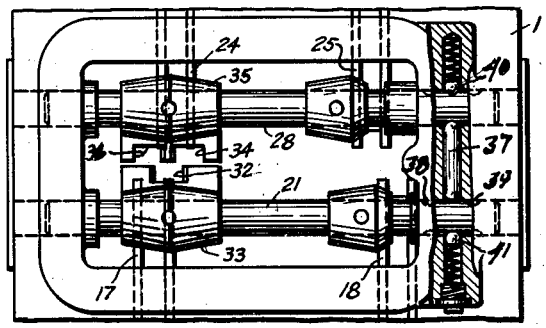
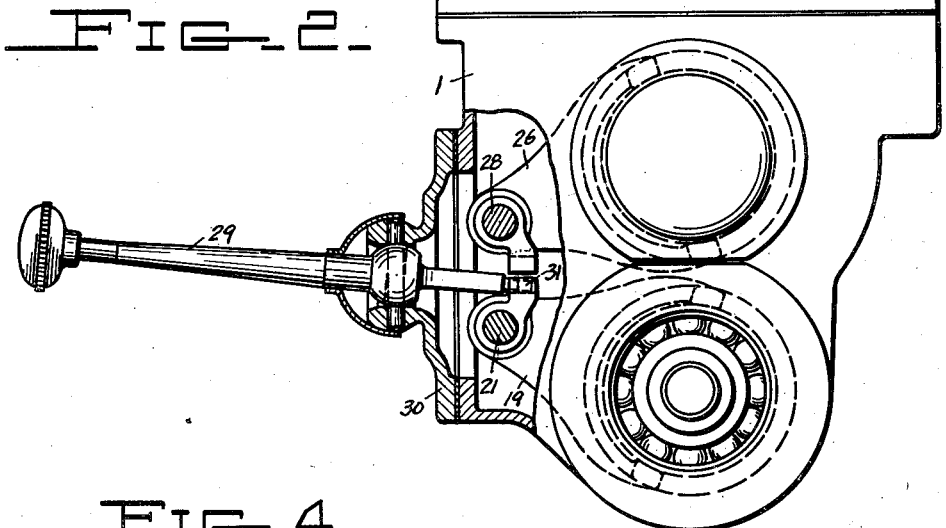
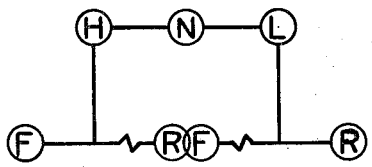
INVENTORS:
Carl D. Peterson &
Elmer J. Barth,
BY
Bodell & Thompson
ATTORNEYS.

Patented Mar. 23, 1948

2,438,183

UNITED STATES PATENT OFFICE 2,438,183

POWER TAKE-OFF

Carl D. Peterson and Elmer J. Barth, Toledo, Ohio; Marion F. Peterson, executrix of said Carl D. Peterson, deceased, assignors to Dana Corporation, Toledo, Ohio, a corporation of Virginia Application May 17, 1944, Serial No. 535,944

3 Claims. (Cl. 74—11)

This invention relates to power take-offs for motor vehicles mountable in the power line between the engine and the driving axle and has for its object a power take-off gearing wherein normally, when the vehicle is in motion or the power take-off not in operation, the vehicle drive is through the main shaft of the power take-off but without idling gears in the power take-off.

The invention further has for its object a particularly simple and compact arrangement of the gears in the power take-off with two speeds forward and two reverse, or an arrangement of shiftable elements, as clutches, whereby with one of the gears clutched to the main or input shaft, one speed forward and one reverse may be obtained in the output shaft of the power take-off and when another of the gears or main or input shaft is clutched thereto, another speed forward or another reverse speed is obtained, the forward and reverse speeds being delivered to a gear on the output shaft, with the forward and reverse trains including gears meshing with the gear on the output shaft on opposite sides of the axis of the output shaft. It further has for its object an arrangement including a single shifting and selecting lever, whereby a shift may be made to forward and reverse only when the shift is made into high or low gear from neutral.

The invention consists in the novel features and in the combinations and constructions hereinafter set forth and claimed.

In describing this invention, reference is had to the accompanying drawings in which like characters designate corresponding parts in all the views.

Figure 2 is an end view, parts being broken away.

Figure 3 is a plan view illustrating the shift rods and the arrangement of the guide for the shift lever in its selecting and shifting movement.

Figure 4 is a diagram illustrating the movement of the handle end of the selecting and shifting lever.

Figure 1:
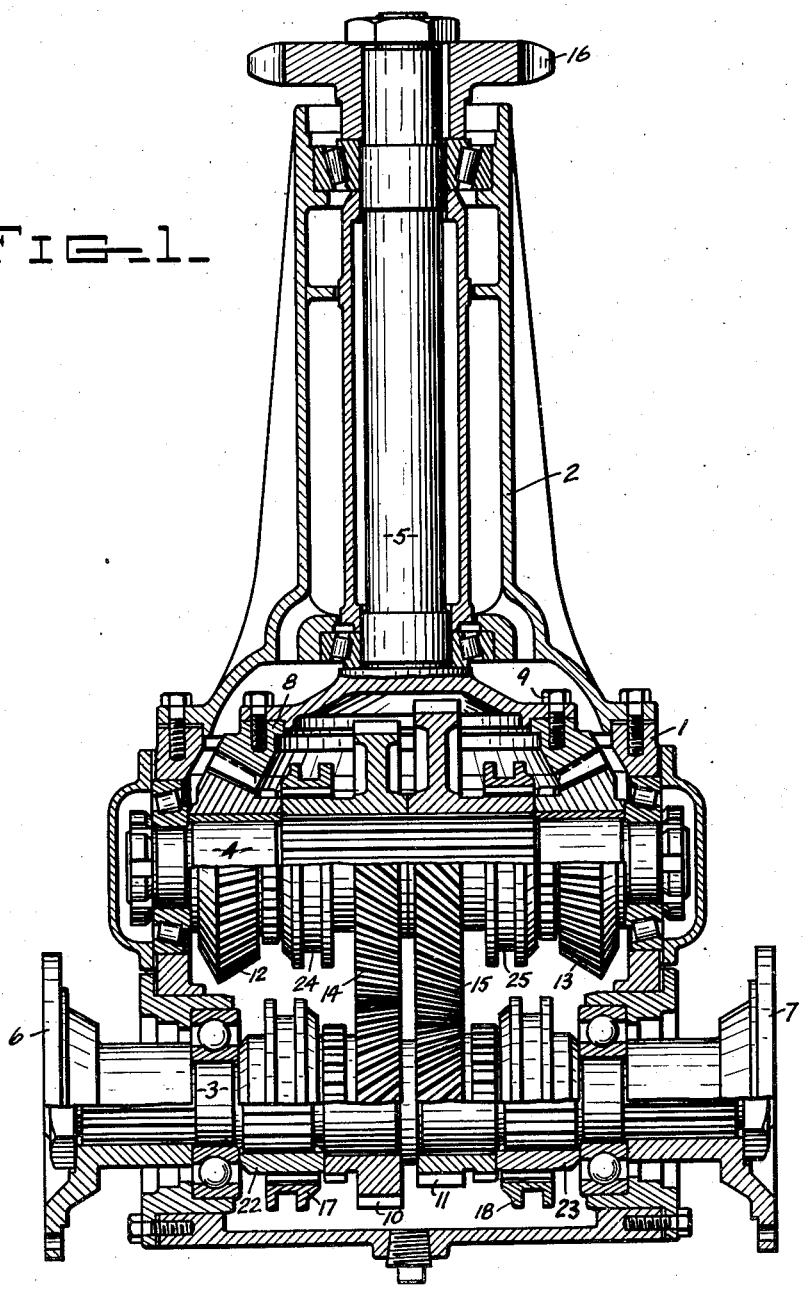
Figure 1 is a longitudinal sectional view of this power take-off gearing.

This power take-off comprises a casing, an input shaft, a countershaft and an output shaft journalled in the casing, the input and countershafts being parallel and the output shaft extending at a right angle to the former shafts, the output shaft having a gear thereon at its inner end, trains of gears between the input shaft through the countershaft to the gear on the output shaft including gears on the countershaft meshing with the gear on the output shaft on opposite sides of the axis of the output shaft, clutches on the input shaft and normally arranged in neutral position and operable in one direction to clutch a gear on the input shaft to said shaft and another clutch shiftable in the opposite direction from neutral to connect another gear to the input shaft, a pair of alternately operable clutches operable to selectively clutch the gears on opposite ends of the countershaft to said shaft and shifting mechanism for the clutches including a single selecting and shifting lever.

The input shaft is in the power line of the motor vehicle in such position that it will be actuated by the engine, when the transmission gearing of the vehicle is in neutral or in a driving position and is preferably located between the engine and the regular transmission gearing. When the vehicle is in operation, the input shaft thus rotates without actuating any of the gears of the power take-off.

I designates the main casing of the power take-off, and 2 a section thereof, in which the output shaft is mounted. 3, 4 and 5 designate the input, counter- and output shafts mounted in suitable bearings in the casing I or the section 2 thereof. The input shaft extends entirely through the casing I and is provided with couplings 6, 7 at its opposite ends for connection in the power line of the motor vehicle. The output shaft 5, which is mounted in suitable bearings in the section 2 of the casing and which also is arranged at an angle and preferably a right angle to the axes of shafts 3, 4, is provided at its inner end with a gear 8 or a disk to which a gear ring is connected, as by screw bolts 9. The trains of gears between the input shaft 3 through the countershaft 4 to the output shaft 5 through the gear 8 includes a pair of gears 10 and 11 loosely mounted on the input shaft 3 so that normally the input shaft rotates relatively to the gears 10 and 11, gears 12 and 13 on the countershaft 4 and meshing with the gear 8 on opposite sides of the axis of the output shaft 5 and gears 14 and 15 on the countershaft 4 and rotatable therewith, these gears 14 and 15 meshing respectively with the gears 10 and 11. The gears 10, 14 and 13 constitute one train of gears for producing a high speed forward, and the gears 11, 15 and 13 constitute another train of gears for effecting low speed forward. The gears 10, 14 and 13 constitute high speed forward train and the gears 10, 14 and 12 constitute high speed reverse train. The gears 11, 15 and 13 constitute low speed forward train and the gears 11, 15 and 12 constitute low speed reverse train.

With the gear 10 clutched to the input shaft 3 as will be presently described and with the gear 13 clutched to the countershaft 4 the output shaft 5 will be driven at high speed forward. Upon clutching of the gear 12 to the countershaft 4, the output shaft 5 will be driven at high speed reverse.

Upon clutching of the gear 11 to the input shaft 3, and clutching of the gear 13 to the countershaft 4, the output shaft 5 will be driven forward in the low speed ratio. By clutching the gear 12 to the countershaft with the gear 11 clutched to the input shaft 3, the output shaft 5 will be driven in reverse direction through the low speed ratio.

The output shaft is provided with suitable means at its outer end for translating its power, here shown as a sprocket 16. The gears 10 and 11 are clutched selectively to the input shaft 3 by clutches 17 and 18, these being shiftable in unison, they being operated by forks 19 mounted on a shift rod 21. The clutches are normally arranged in neutral position, as shown in Figure 1, and when shifted to the right, the clutch 17 clutches the gear 10 to the input shaft 3 and when shifted to the left from neutral, the clutch 18 clutches the gear 11 to the input shaft 3. The clutches 17 and 18 are collars slidably splined on collars 22, 23 which in turn are splined on the input shaft 3 and held from axial displacement in any suitable manner.

The gears 12 and 13 on the countershaft 4 are clutched to the countershaft 4 or the hubs of gears 14 and 15 which are in turn splined on the shaft 4 by clutch collars 24, 25 normally arranged in neutral position and shiftable by forks, as 26, on another shift rod 28 parallel to the shift rod 21. These shift rods are mounted in suitable guides in the side of the main casing 1. They are selected and shifted by means of a hand lever 29 suitably mounted in a cover plate 30 to have a lateral selecting and a fore and aft shifting movement. When in neutral position, as indicated in the chart (Figure 4), the finger 31 at the inner end of the lever 29 is located in a notch 32 in a block 33 on the high and low shift rod 21, so that the lever can be operated fore and aft to shift either the clutch 17 or 18 into clutching engagement to produce high or low speed in the output shaft 5. When in high speed position, that is, when the clutch 17 clutches the gear 10 to the input shaft 3, the lever 29 may be shifted laterally to select the shift rod 28 and the selecting finger 31 enter a notch 34 in a block 35 on the shift rod 28, so that now upon fore or aft movement of the lever 29, the clutch 25 can be moved into operative position to clutch the gear 13 to the countershaft 4 to drive the output shaft 5 forward in high speed or clutch 24 moved into operative position to clutch gear 12 to drive the output shaft 5 in high speed reverse. Likewise, as when the shifting lever is engaged with the notch 32 of the high and low speed shift rod 21, and the lever is shifted into low position, as shown in the chart (Figure 4), the notch 32 in the block 33 will be moved into alinement with a notch 36 in the block 35 similar to the notch 34 so that now when the lever 29 is shifted in one direction, forward speed in the low gear ratio will be obtained and on shifting of the lever 29 to move the block in the opposite direction, reverse speed through the low gear ratio will be obtained through the gear 12, this movement of the shifting lever shifting in the clutch collar 24.

It will be borne in mind that the chart (Figure 4) shows the movement of the handle or ball end of the lever 29 and that the movement of the lower end or finger of this lever is in the opposite direction from that indicated in the chart, because of the handle end of the lever and the finger being located above and below the pivot of the lever.

An interlock is usually provided between the shift rods 28 and 21 to prevent shifting of the clutches 24, 25 on the countershaft 4 into engaged position, unless one of the clutches 17, 18 on the input shaft is shifted into engaged position. The interlock may be of any suitable construction here shown as a sliding bolt 37 located in a passage in a wall of the gear box between the guide openings for the shift rods 28, 21, the bolt coacting at its opposite ends with cam notches in the shaft, it extending at one end into a notch in the rod 28 when riding at its other end on a hump between two notches on the rod 21, when the clutches 17, 18 are in disengaged position. When either of the clutches 17 or 18 is shifted to "in" position, the bolt alines with a notch 38 or 39 on the shift rod 18 permitting the bolt to be cammed out of its notch in the shift rod 28 when shifting force is applied to the rod 28. Suitable spring-pressed poppets 40, 41 coact with notches in the rods 28, 21 to restrain the rods from shifting when in neutral and in shifted positions.

What we claim is:

1. A power take-off comprising a casing, an input shaft and a countershaft mounted in parallelism in the casing, and an output shaft extending at an angle to the countershaft, gear trains between the input and the countershafts including gears on the input shaft, one for each train, and clutches for selectively connecting and disconnecting said gears to and from the input shaft, gears in said trains respectively on the countershaft, a gear on the output shaft, additional gears mounted on the countershaft and meshing with the gear on the output shaft on opposite sides of the axis of the output shaft, clutches for clutching and unclutching the last gears to and from the gears on the countershaft respectively and selecting and shifting means for the clutches.

2. A power take-off including a casing, an input shaft and a countershaft mounted in parallelism in the casing, and an output shaft in the casing extending at an angle to the countershaft, the input shaft extending beyond opposite sides of the casing and having means for direct drive coupling in the power line of a motor vehicle, trains of gears between the input and countershafts and between the countershaft and the output shaft, each train including a gear on the input shaft, the input shaft normally rotating relative to the gears thereon, and means for selectively clutching thereto said gears on the input shaft.

3. A power take-off including a casing, an input shaft and a countershaft mounted in parallelism in the casing, and an output shaft in the casing extending at an angle to the countershaft, the input shaft extending beyond opposite sides of the casing and having means for direct drive coupling in the power line of a motor vehicle, trains of gears between the input and countershafts and between the countershaft and the output shaft, each train including a gear rotatively mounted on the input shaft, and means for selectively clutching thereto said gears on the input shaft, each gear train also including a gear rotatable with the countershaft, gears on opposite ends of the countershaft, and a single gear on the output shaft meshing with the last-mentioned gears on opposite sides of the axis of the output shaft and clutches for selectively clutching and de-clutching the gears of the trains rotatable with the countershaft to the gears on the ends of the countershaft.

CARL D. PETERSON.
ELMER J. BARTH.

REFERENCES CITED

The following references are of record in the file of this patent:

UNITED STATES PATENTS

| Number | Name | Date |
|---|---|---|
| 847,048 | Ehle | Mar. 12, 1907 |
| 1,324,592 | Hicks | Dec. 9, 1919 |
| 2,191,909 | Wagner | Apr. 2, 1940 |